Feb. 6, 1973     J. G. LEWIS     3,714,705

METHOD OF ASSEMBLING A DYNAMO-ELECTRIC MACHINE

Filed Sept. 9, 1971     3 Sheets-Sheet 1

INVENTOR:
JOHN G. LEWIS

Feb. 6, 1973   J. G. LEWIS   3,714,705
METHOD OF ASSEMBLING A DYNAMO-ELECTRIC MACHINE
Filed Sept. 9, 1971   3 Sheets-Sheet 2

INVENTOR:

JOHN G. LEWIS

BY:

INVENTOR:
JOHN G. LEWIS

United States Patent Office 3,714,705
Patented Feb. 6, 1973

3,714,705
METHOD OF ASSEMBLING A DYNAMO-
ELECTRIC MACHINE
John G. Lewis, St. Louis, Mo., assignor to Emerson
Electric Co., St. Louis, Mo.
Filed Sept. 9, 1971, Ser. No. 178,953
Int. Cl. H02k 15/00, 15/14, 15/16
U.S. Cl. 29—596                                    17 Claims

ABSTRACT OF THE DISCLOSURE

An electric motor having a stator with a central bore, a rotor part rotatably mounted in the bore, formed sheet metal end shields secured to the stator, and bearing assemblies press fitted in the end shields for rotatably supporting the rotor shaft. Each end shield includes a central seat for supporting the bearing assembly. In one embodiment, the seat includes an axially inwardly extending cup integral with a formed sheet material end shield, and in another embodiment the seat is merely a lip defining a hole in the end shield, and a separate cup forms a part of the bearing assembly. The bearing assembly includes a spring supported by the cup for biasing the bearing against a seating surface in the bearing assembly. The motor is assembled by coating the stator with a varnish, allowing the varnish to air dry to a semi-cure state, placing the end shield on the stator in contact with the varnish, with the bearing in contact with a spacer on the rotor shaft, curing the varnish, deflecting a portion of the end shield around the seat inwardly, thereby shifting the bearing with respect to the seat, and releasing the end shield with the bearing maintained in its shifted position, thereby establishing a desired end play for the rotor.

BACKGROUND OF THE INVENTION

This invention relates to dynamo-electric machines and a method of constructing them. It has particular, but not exclusive, use in the manufacture of small and fractional horsepower electric motors of the type having a pair of end shields supporting bearings in which the ends of the rotor shaft are journaled. In the construction of such motors, it has been found desirable to form the end shields from sheet material rather than casting them, because of the savings in cost, weight, and size realized. One of the chief drawbacks of such a construction has been in forming a sufficiently strong seat for the bearings while providing the bearings with an adequate, well-sealed lubrication system. Another problem of such a construction, one also encountered with cast end shields, is in controlling the small amount of axial movement, or end play, which must be allowed the rotor. The dangers of providing too much or too little end play are well known in the art.

One of the objects of this invention is to provide a dynamo-electric machine having a compact, highly efficient, well-sealed bearing lubrication system.

Another object is to provide an end shield for such a machine which is compact, strong, and inexpensive to manufacture, and which provides excellent concentricity of its bearing with the stator bore without requiring any machining.

Another object is to provide such a machine which can be assembled with a minimum of effort and without requiring expensive adhesives.

Another object is to provide a method for constructing such a machine which provides a closely controlled end play far more precisely and simply than methods known heretofore.

Other objects will occur to those skilled in the art in the light of the following description and accompanying drawing.

SUMMARY OF THE INVENTION

In accordance with one aspect of this invention, generally stated, a dynamo-electric machine is provided having a stator with an inner surface defining an axial bore, a rotor rotatably mounted in the stator bore, spaced radially from the bore defining surface, the rotor including a shaft extending from both axial ends thereof, and means for journaling the shaft at each axial end of the stator, the journaling means including at one axial end of the stator an end shield having a central seat comprising a turned lip in the end shield and a bearing assembly supported by the seat. The bearing assembly includes a self-aligning bearing, radially spaced from the seat, including a central bore in which the shaft is journaled and an arcuate seating face on its axially outer side. The bearing assembly also includes a seating surface for the arcuate seating face of the bearing and biasing means for biasing the arcuate face into engagement with the seating surface while permitting the bearing to align itself with the shaft. The bearing assembly may also include a cap part defining the axially outer wall of a lubricant retaining reservoir and may also include a cup which forms the axially inner wall of the lubricant retaining reservoir. In one embodiment, the cup is simply a reentrant flange on the seat-defining lip. In another embodiment the cup is a separate piece having a side wall overlapping the lip and secured to it. In the preferred embodiments the biasing means are a coil spring trapped between the bottom portion of the cup and a radially extending face on the bearing. The cap and cup together provide an easily sealed oil reservoir which, with the use of oil slingers on the shaft or other lubricant baffling or sealing, is far more efficient in retaining lubricant than presently known lubrication systems, especially for end shields formed out of sheet metal material.

The method of the present invention includes assembling the usual laminated stator core and stator windings, coating the windings and core with an adhesive varnish, allowing the varnish to dry to a semi-cured state, then positioning a margin of the end shield in overlapping relationship with the stator core in contact with the semi-cured varnish, and then curing the varnish to bond the end shield to the stator core. The method also includes a procedure for adjusting the rotor end play more simply and accurately than presently known procedures. In the preferred embodiments, a special tool is used to deform the end shield axially inward about a thrust receiving means (such as the bearing) carried by the end shield, with the end shield positioned on the stator, the rotor in the stator bore, and thrust means on the rotor contacting the thrust receiving means carried by the end shield. The end shield is then returned to its operational configuration to establish the desired end play. In the assembly of the illustrative embodiments of motor of this invention, each bearing assembly is initially held frictionally in the seat in its end shield at a position known to be axially inward of the desired final position of the bearing relative to the seat. The end shields are then forced onto the stator with a tool which deforms the end shields inward a controlled distance about the seat. In this operation, radially extending spacers on the rotor shaft engage the bearings and force the bearing assemblies axially outward in their seats. When the end shields are released they return to their initial positions, carrying the bearings with them, thus establishing an end play equal to the sum of the distance each is deformed.

DESCRIPTION OF THE PREFERRED EMBODIMENTS

Figure 1:
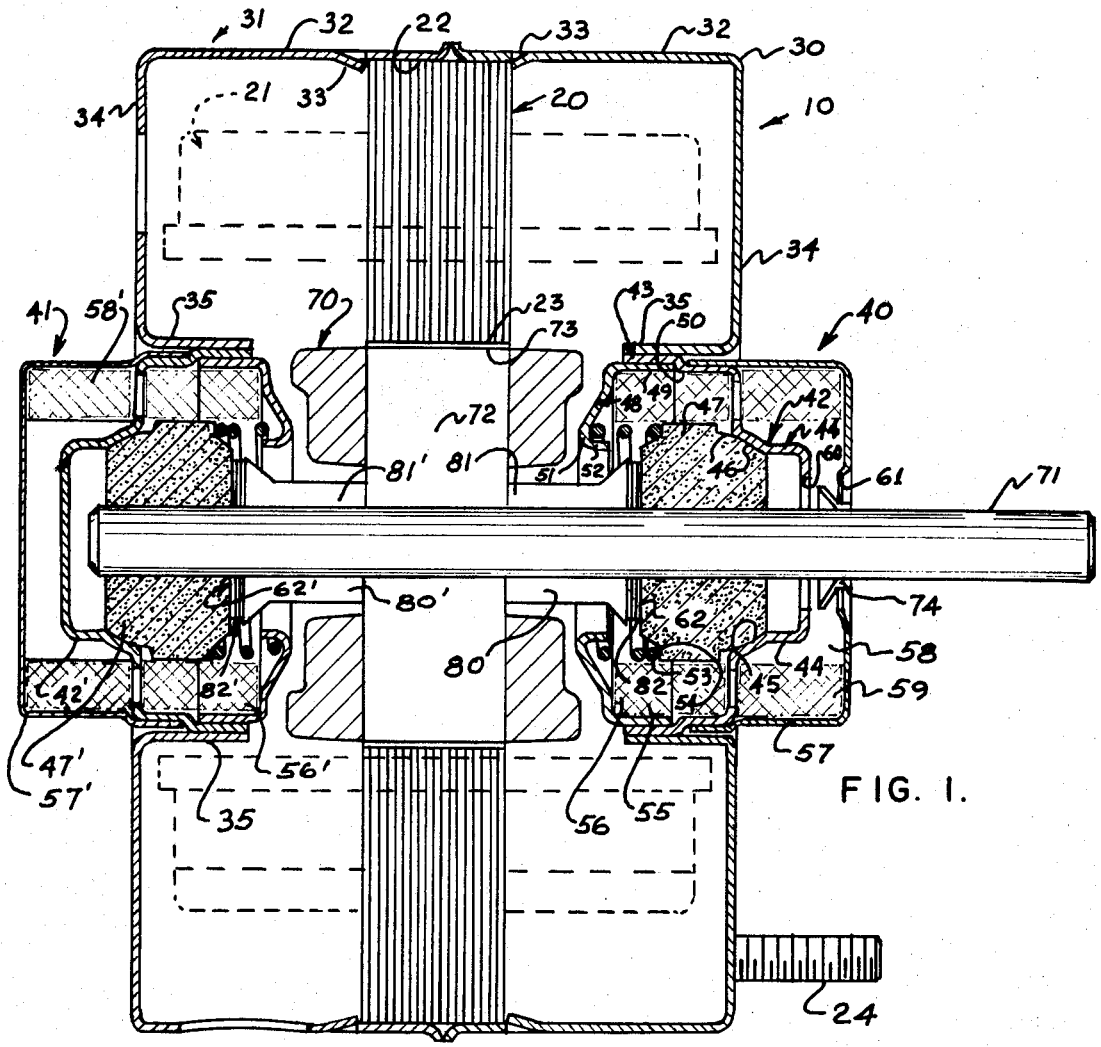
FIG. 1 is a view in cross-section of an electric motor embodying the improved construction of this invention.
Figure 2:
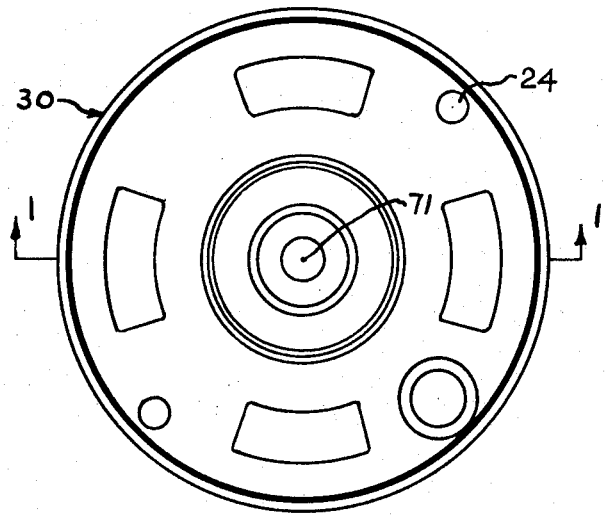
FIG. 2 is a view in end elevation of the motor shown in FIG. 1.

Referring now to the drawings, and in particular to FIGS. 1 and 2 for one illustrative embodiment of dynamoelectric machine of this invention, reference numeral 1 indicates a fractional horsepower electric motor embodying the construction of the present invention.

The motor 10 includes a stator core 20 which may be of the standard laminated construction and which carries windings 21 disposed in slots in the core in the usual manner. The stator core has an outer surface 22 and has an inner surface 23 which defines an axial bore in the stator core. A pair of end shields 30 and 31 have axially extending annular walls 32 snugly engaging the outer surface 22 of the stator core 20 and secured to it. Sets of ears 33 spaced circumferentially around each end shield engage the end faces of the stator core 20 to provide proper axial positioning of the end shields. At the centers of face portions 34 of the end shields, axially inwardly extending lips 35 form open seats for bearing assemblies 40 and 41. The end shields 30 and 31 are formed by conventional metal working methods, such as drawing, from sheet metal material such as sheet steel.

The bearing assembly 40 in the end shield 30 includes a cap part 42 having an axially extending annular wall 43 and an end wall 44. The annular wall 43 is proportioned to form a friction fit with the inner face of the lip 35 on the end shield. An annular concave seating surface 45 on the inner face of the end wall 44 mates with a convex seating surface 46 on the axially outer side of a bearing 47. The bearing 47 is therefore self-aligning. The bearing 47 may be made of conventional sintered material. The bearing assembly 40 also includes a cup 48 having an axially extending annular wall 49 proportioned to form a tight fractional fit with the inner surface of the annular wall 43 of the cap 42. A shoulder 50 on the cap side wall 43 positions the cup 48 axially in the cap 42. A bottom wall 51 of the cup 48 forms an axially inner closure part for the bearing assembly 40. A reentrant lip 52 on the bottom wall 51 defines an aperture for a rotor shaft 71 and a spacer 80 as hereinafter described. A coil spring 53 is trapped between the bottom 51 of the cup 48 adjacent the reentrant lip 52 and a radially extending annular face 54 on the axially inner side of the bearing 47. A loop of wicking 55 is positioned in the space between the radially outer face of the bearing 47 and the axially outer wall of the lubricant reservoir 56 formed by the cap 42 and the cup 48. A hub 57 is fitted over the cap 50 in the annular groove between the turned lip 35 and the annular wall 43 of the cap 42 axially outward of the shoulder 50. The hub 57 serves both as a convenient means of mounting the motor 10 and as a supplementary oil reservoir 58. A loop of wicking 59 in the supplementary reservoir 58 contacts the wicking 55 in the main reservoir 56. Central openings 60 and 61 in the end faces of the cap 42 and hub 57 respectively are provided for a shaft 71 of the rotor 70. An oil slinger 74 on the shaft 71 axially interior of the opening 61 in the hub 57 prevents leakage of oil out of the bearing assembly 40 along the shaft 71.

The second bearing assembly 41 in the second end shield 31 is generally identical with the first bearing assembly 40 and like parts of the assembly 41 are indicated by corresponding primed numerals. Because the shaft 71 terminates just beyond the bearing 47 of the bearing assembly 41, the closure walls of the cap 42' and hub 57' are not perforated.

The rotor 70 includes a standard laminated squirrel-cage part 72 having an outer surface 73 spaced from the inner surface 23 of the stator 20. The squirrel-cage portion 72 is secured to the shaft 71, and the shaft 71 is journaled in the bearings 47 and 47'. Between the squirrel-cage portion 72 and the bearings 47 and 47' a pair of spacers 80 and 80' are positioned over the shaft 71. The spacers 80 and 80' include main spacer pieces 81 and 81' and thrust washers 82 and 82' respectively. The thrust washers 82 and 82' cooperate with flat axially inner faces 62 and 62' on the bearings 47 and 47' to restrict the axial movement of the rotor 70 toward either bearing 47 or 47'. The end play allowed the rotor 70 is therefore equal to the difference between two dimensions: the distance between the bearing faces 62 and 62' and the combined axial thickness of the squirrel-cage part 72 and the spacers 80 and 80'.

The motor 10 is assembled as follows. The bearing assemblies 40 and 41 are assembled except for the hubs 57 and 57', and the wicking 55 and the bearing 47 are impregnated with lubricating oil. The bearing assemblies are then pressed into the seats 35 in the end shields, preferably from the insides of the end shields, to a position somewhat axially inward of their final operative positions shown in FIG. 1.

A wound stator 20 is dipped in an adhesive varnish which quickly air dries to a semi-cured state in which the varnish is dry to the touch. Suitable varnishes are well known in the art. The varnish serves to hold the stator laminations together and to hold the windings 21 in place, as is well known in the art. The bore-defining inner surface 23 of the stator is protected during the dipping process in any usual manner.

Figure 7:
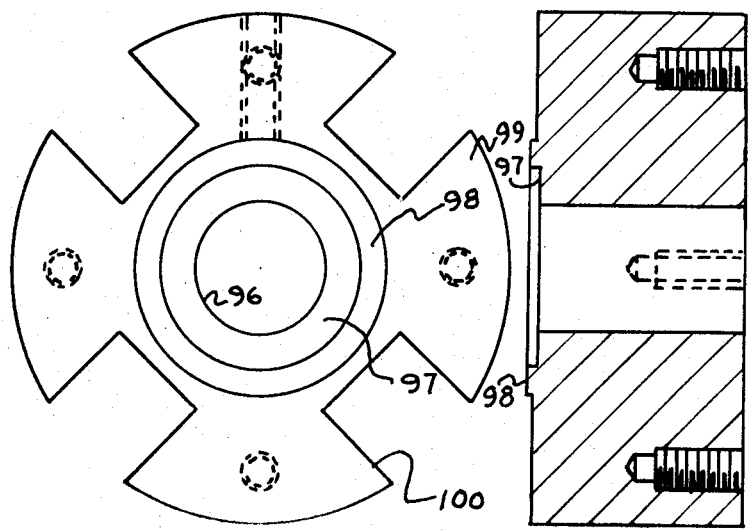
FIG. 7 is a top plan view of the lower jaw of the tool shown in FIG. 5.
Figure 6:
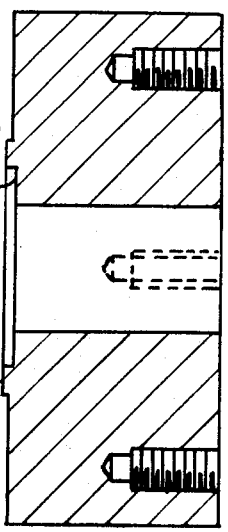
FIG. 6 is an enlarged sectional view of the lower jaw of the tool shown in FIG. 5.
Figure 5:
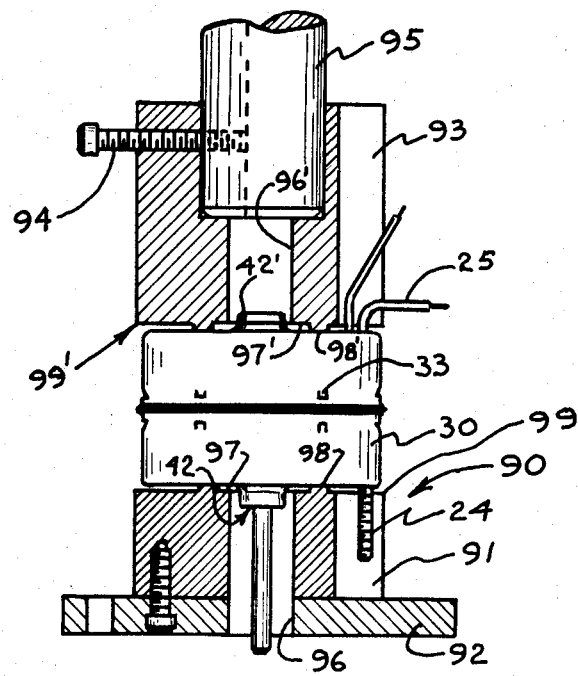
FIG. 5 is a view in front elevation, partially cut away, of a tool for use in practicing an illustrative embodiment of the method of this invention, showing its use on the motor shown in FIG. 1.

When the varnish on the stator has air dried to its semi-cured state, the motor is assembled on an assembly tool 90, as shown in FIGS. 5–7. The assembly tool 90 is simply a press having a fixed lower jaw 91 secured to a base 92 and a movable upper jaw 93 secured by a set screw 94 to the ram 95 of the press. The jaws 91 and 93 are provided with central bores 96 and 96' respectively, concentric bearing assembly limiting faces 97 and 97' respectively, concentric deforming rings 98 and 98' respectively, and flat radially outer end shield engagement surfaces 99 and 99' respectively. The bearing assembly limiting surfaces 97 and 97' have an outer diameter slightly greater, for example 1/16 of an inch greater, than the inner diameters of the seats 35 in the end shields. The axial depths of the bearing assembly limiting faces 97 and 97' depend on the design of the motor, and are illustratively 0.02 and 0.04 inch from the top of the deforming rings 98 and 98' respectively. The height of the deforming rings 98 and 98' over the limiting surfaces 99 and 99' determines the end play of the rotor. In this illustrative embodiment, the height of each ring 98 and 98' is 0.005 inch, and the motor is therefore provided with a 1/100 inch total end play as will hereinafter become apparent. Slots 100 around the jaws 91 and 93 accommodate mounting bolts 24 and lead wires 25.

The preassembled end shield 30 and bearing assembly 40 are placed on the lower jaw 91 of the assembly tool 90, the rotor 70 is placed in position with the longer end of the shaft 71 through the bearing 47, and the spacer 80 is positioned between the thrust receiving surface 62 on the bearing 47 and the squirrel-cage portion 72 of the rotor 70. The oil slinger 74 may be pressed onto the shaft 71 at this point, if desired. The stator 20 is then positioned on the rim of the end shield 30 and the pre-assembled end shield 31 and bearing assembly 41 are placed on the shaft with the second spacer 80' between the rotor squirrel-cage 72 and the thrust receiving surfaces 62' of the second bearing 47'. The fit between the outer face 22 of the stator 20 and the annular wall 32 of the end shields is sufficiently tight that the varnish on the outer surface 23 of the stator 20 prevents free movement of the end shields over the stator. The ram 95 is then lowered to force the end shield onto the stator. The deforming rings 98 and 98' deflect the end shields slightly about their bearing seats 35 because of the resistance between the outer surface 22 of the stator and the annular walls 32 of the end shields. The distance each end shield is deformed is accurately controlled by the end shield engagement surfaces 99 and 99' on the jaws 91 and 93 which engage the end shields radially outward of the deforming rings 98 and 98' respectively. As the end shields approach their final positions, the spacers 80 engage the bearings 47 and force the bearing assemblies axially outward in their seats. The bearing assembly limiting surfaces 97 and 97' prevent excessive axial displacement of either bearing assembly 40 or 41. If the stacks of laminations making up the stator core 20 and the squirrel-cage portion 72 of the rotor are both of the desired axial dimensions the ears 33 on the end shields will contact the outer axial faces of the stator core 20 while the bearing caps 42 and 42' have been backed out of their seats to positions nearly contacting the bearing assembly limiting surfaces 97 and 97'. If, however, the stator stack is too wide or the rotor stack too narrow, the caps or one of the caps will not be moved this far when the end shield ears 33 bottom on the stator core 20. If, on the other hand, the stator stack is too narrow or the rotor stack too wide, the caps will both contact the bearing assembly limiting surfaces 97 and 97' when the end shields bottom on the stator core, and in an extreme case, one or both sets of end shield ears 33 will be prevented from bottoming on the stator at all. It will be seen, however, that the failure of the ears to bottom on the stator core has no significant effect on the strength or efficiency of the motor.

If desired, the outer surface of the stator core may be made so proportioned that it does not engage the end shields sufficiently to cause the end shields to be deformed as they are moved to their final positions on the stator core. The end shields nonetheless will be deformed and the bearing assemblies backed out in their seats when the end shields bottom on the stator or the rims of the end shields contact each other, unless the rotor stack is so excessively wide that both bearing assemblies 40 and 41 are backed against the limiting surfaces 97 and 97' before the end shields can be deformed.

The motor is then released from the tool 90, thereby allowing the end shields to return from their deformed configurations to their operational configurations, with an end play equal to the total distance the two end shields were deformed, i.e., about 0.01 inch. An epoxy resin is then introduced into the annular grooves and the hubs 57 and 57' are inserted into the grooves. The oil reservoirs 56 and 56' and 58 and 58' are thus completely sealed at the junction of the bearing assemblies 40 and 41 with the seats 35. If desired, the hub length may be precisely determined by the use of a jig. The motor is then baked to cure the varnish and resin to a final hard state.

Figure 3:
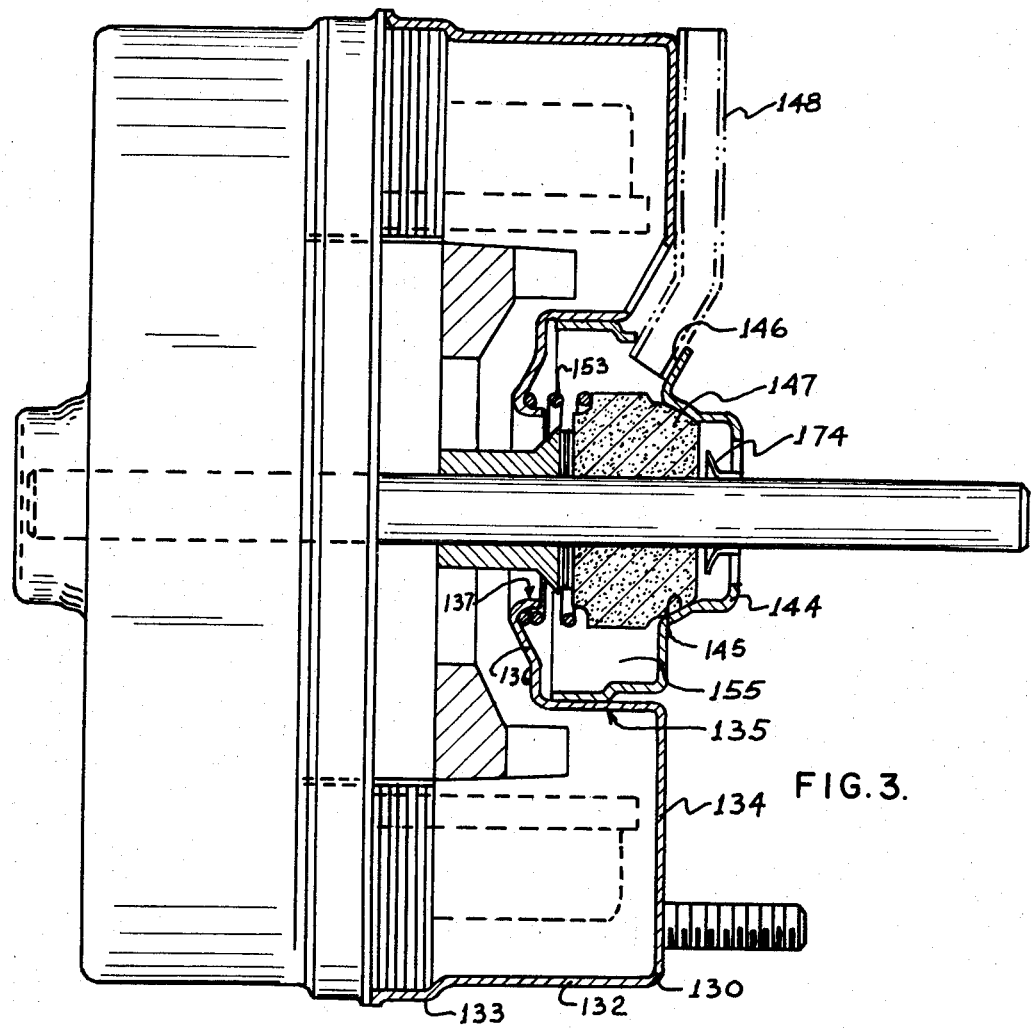
FIG. 3 is a fragmentary view in cross-section showing a second illustrative embodiment of motor of this invention.

A second embodiment of dynamo-electric machine of this invention is shown in FIG. 3. This embodiment differs from that shown in FIGS. 1 and 2 primarily in the shape of the end shields 130 of this embodiment. Each end shield 130 includes an axially extending annular wall 132 and a face portion 134. An annular shoulder 133 in the wall 132 provides an axial abutment for the stator stack. A central seat is defined at the center of the face portion 134 by an inturned annular flange 135 having a radially reentrant wall 136 and an axially reentrant turn 137. The radially reentrant portion 136 and axially reentrant portion 137 of the flange 135 form the axially inner wall of a lubricant reservoir 155, as well as forming a seat for a coil spring 153 which biases a self-aligning bearing 147 into contact with a seating surface 145 on a cap 144. The cap 144 forms the axially outer wall of the reservoir 155, and differs from the cap 44 of the first illustrative embodiment only in that it is provided with an opening 146 for receiving an oil tube 148. In this illustrative embodiment, the hub 57 is omitted and an oil slinger 174 identical with the slinger 74 of the first embodiment is positioned within the cap 144. The assembly of this embodiment of motor may be carried out in precisely the same way as the method utilized in assembling the first illustrative embodiment of motor. Preferably, the oil tube is inserted last.

Figure 4:
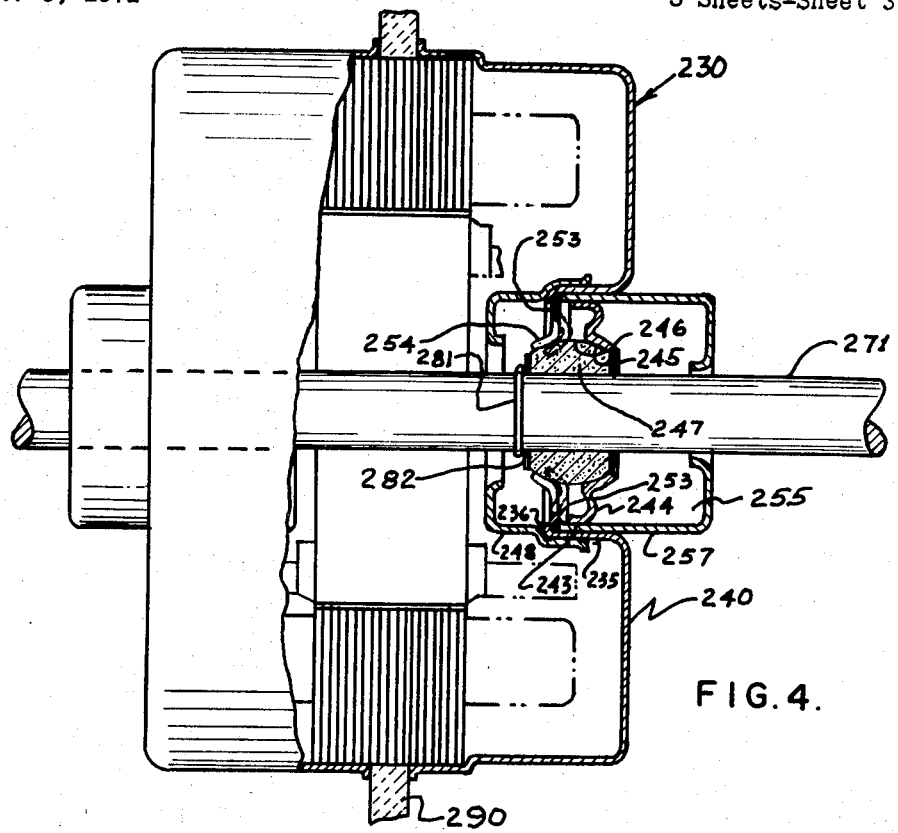
FIG. 4 is a fragmentary view in cross-section showing a third illustrative embodiment of motor of this invention.

Yet another embodiment of dynamo-electric machine of this invention is shown in FIG. 4. The end shield 230 of this embodiment differs from the end shield of the preceding embodiment in that the central seat in the end shield is defined by an inturned lip 235 having only a small radially reentrant flange 236. The bearing assembly 240 of this embodiment includes a bearing 247 having a spherical outer face 246. A seating ring 244 provides a concave spherical seat 245 for the axially outer face of the bearing 247. A biasing ring 253 has an outer periphery which seats on the annular flange 236 of the seat 235 and also has four radially inwardly extending spring fingers 254 which engage the axially inner spherical face of the bearing 247 and bias the bearing 247 into engagement with the seating face 245 of the seating ring 244. The unbiased position of the spring fingers 254 is shown in broken lines in FIG. 4. A hub 257 is press fitted into the seat 235 and a periphery axially extending flange 243 of the seating ring 244 is press fitted into the hub piece 257. The hub 257 forms the axially outer wall of a lubricant reservoir 255. The axially inner wall of the reservoir 255 is defined by a cup 248 press fitted over the outer face of the annular lip 235.

The embodiment of motor shown in FIG. 4 may conveniently be assembled by inserting the biasing ring 253 into the seat 235, placing the bearing 247 on the spring arms 254, pressing the support ring 244 into the hub 257 a distance slightly less than the distance ultimately desired, pressing the hub 257 into the seat 235, and pressing the cup 248 over the seat 235. The remainder of the assembly may be carried out in precisely the same way as the assembly of the embodiment of FIG. 1. A thrust washer 282 riding loose on the shaft 271 of the rotor and a thrust ring 281 carried in an annular groove in the shaft 271 limit the axial movement of the shaft 271. If desired, the hub 257 may be held against axial movement relative to the end shield by the assembly tool, so that only the seating ring 244 moves to establish the proper end play. Further, if desired, a spacer such as is shown in broken lines at 290 in FIG. 4, may be used to ensure that the dimensions of the motor meet close tolerances. If either of the latter approaches is used, the use of additional supports to ensure axial alignment of the stator and squirrel-cage part of the rotor may be necessary or desirable.

Numerous variations in the motor and method of assembling it, within the scope of the appended claims, will occur to those skilled in the art in the light of the foregoing disclosure.

Having thus described the invention, what is claimed and desired to be secured by Letters Patent is:

1. A method of assembling a dynamo-electric machine having a stator, said stator having an inner surface defining an axial bore; a rotor part in said bore spaced radially from said inner surface defining said bore, said rotor being rotatably supported at opposite axial ends of said stator; an end shield mounted on said stator at one axial end of said stator; thrust receiving means on said end shield; and means on said rotor cooperating with said thrust receiving means for limiting axial movement of said rotor toward said thrust receiving means, said method comprising deforming said end shield from an operational configuration axially inward about said thrust receiving means, with said end shield on said stator, with said rotor in said stator bore, and with said thrust receiving means contacting said cooperating means on said rotor, and thereafter returning said end shield to its operational configuration, thereby establishing at least a portion of a desired end play of said rotor.

2. The method of claim 1 wherein said end shield is deformed while said end shield is moved to a permanent position on said stator.

3. The method of claim 1 wherein said end shield is deformed with a tool having an annular rib for deforming said end shield and a surface radially exterior of said rib for engaging said end shield and limiting the extent of said deflection.

4. A method of assembling a dynamo-electric machine having a stator, said stator having an inner surface defining an axial bore; a rotor part in said bore spaced radially from said inner surface defining said bore, said rotor being rotatably supported at opposite axial ends of said stator; an end shield mounted on said stator at one axial end of said stator, said end shield including an axially extending seating surface; thrust receiving means having an axially extending wall frictionally engaging said seating surface in overlapping relation with said seating surface; and means on said rotor cooperating with said thrust receiving means for limiting axial movement of said rotor toward said thrust receiving means, said method comprising positioning said thrust receiving means in overlapping relation with said seating surface axially inward of a final position of said thrust receiving means, and thereafter, with said rotor in said stator bore and with said end shield on said stator, shifting said thrust receiving means axially outward with respect to said seating surface to said final position.

5. The method of claim 4 wherein said thrust receiving means is shifted while said end shield is moved to a permanent position on said stator.

6. In the method of assembling a dynamo-electric machine having a stator, said stator having an inner surface defining an axial bore, a rotor in said bore, spaced radially from said inner surface defining said bore, said rotor including a shaft part extending from opposite axial ends thereof, first and second end shields mounted on said stator, first and second seats in said first and second end shields respectively, first and second bearing means mounted in said first and second seats respectively, said bearing means including journaling means for journaling said rotor shaft and thrust receiving means cooperative with said rotor for limiting axial movement thereof, said method including, in a desired order, the steps of assembling said rotor in said stator bore, mounting said first and second bearing means in said first and second seats respectively, journaling said shaft in said first and second bearing means, and mounting said end shields on said stator, the improved method of establishing end play of said rotor comprising, (a) at a desired stage in the assembly of said dynamo-electric machine, deforming at least said first end shield axially inward from an operational configuration, and (b) following all of the aforesaid assembly steps causing said first end shield to assume said operational configuration without axially shifting said means for limiting axial movement of said rotor relative to said first seat.

7. The improvement of claim 6 wherein said second end shield is deformed about said second seat axially inward from an operational configuration at the same time said first end shield is deformed, the deformation of each of said end shields being equal to half the desired end play of said rotor, and wherein both said end shields are caused to assume their operational configurations without shifting their respective thrust receiving means relative to said first and second seats respectively.

8. The improvement of claim 6 wherein said first end shield is formed of sheet material, said seat comprising a turned lip on said end shield, said deformation of said end shield being insufficient to overcome the elastic limit of the end shield.

9. The improvement of claim 8 wherein said stator and said rotor each comprise a stack of magnetically permeable laminations.

10. The improvement of claim 9 wherein said stack of stator laminations is coated with an adhesive varnish, and wherein said end shields overlap an outer periphery of said stack of laminations, said end shields being held to said stator by said adhesive varnish.

11. The improvement of claim 10 wherein said varnish is air dried to a semi-cured state before said end shields are placed on said stator, said varnish thereafter being heat cured.

12. The improvement of claim 6 wherein said bearing means comprises a self-aligning bearing having a central bore comprising said journaling means, an axially inner side comprising said thrust receiving means and an arcuate seating face on an axially outer side; seating means for seating said arcuate seating face of said bearing, and biasing means for biasing said arcuate face of said bearing into engagement with said seating surface while permitting said bearing bore to align itself with said shaft, said seating means moving axially outward relative to said seat when said dynamo-electric machine is assembled.

13. The method of assembling a dynamo-electric machine having a stator, said stator having an inner surface defining an axial bore, at least one end shield secured to said stator, a seat in said end shield, bearing means supported by said seat, a rotor part in said bore spaced radially from said bore-defining inner surface, a shaft secured to said rotor part and journaled in said bearing means, and a thrust bearing between said bearing means and said rotor part for preventing excessive movement of said rotor part toward said bearing, comprising positioning said bearing means in said seat and said shaft in said bearing means with thrust receiving means between said rotor part and said bearing means, in contact with said bearing means, said thrust receiving means including at least said thrust bearing, and thereafter shifting said bearing means axially outward with respect to said seat to establish at least a portion of a desired end-play of said rotor part.

14. The method of claim 13 wherein said thrust bearing comprises a spacer mounted on said shaft.

15. The method of claim 13 wherein said bearing means comprise a self-aligning bearing having an arcuate seating face on an axially outer side of said bearing, a cap piece having a seating surface engaged by said arcuate face on said bearing, and biasing means acting on said bearing to bias said arcuate face into engagement with said seating surface.

16. The method of claim 13 wherein a margin of said end shield is secured to said stator before said bearing is shifted axially outwardly.

17. In the method of assembling a dynamo-electric machine having a stator, said stator having an inner surface defining an axial bore; a pair of end shields secured to said stator, a seat in at least one of said end shields, first bearing means mounted in said seat, second bearing means supported by the other of said end shields, and a rotor in said bore, spaced radially from said inner surface defining said bore, said rotor having a shaft journaled in said first and second bearing means, the improved method of establishing end play of said rotor comprising assembling at least said rotor, said stator and said end shields with said shaft journaled in said first and second bearing means, and thereafter moving said first bearing means axially with respect to said seat to an operational position and maintaining said first bearing means in said operational position in said seat for operation of said dynamoelectric machine.

References Cited

UNITED STATES PATENTS

| | | | | |
|---|---|---|---|---|
| 3,544,820 | 12/1970 | Wightman | | 310—42 |
| 3,484,934 | 12/1969 | Wightman | | 29—596 |
| 3,419,957 | 1/1969 | Stone | | 29—596 |
| 2,958,908 | 11/1960 | Thompson et al. | | 308—163 X |
| 3,145,313 | 8/1964 | Tupper | | 310—42 |
| 3,437,853 | 4/1969 | Arnold | | 29—596 X |
| 3,167,672 | 1/1965 | Tupper | | 310—90 |

CHARLES W. LANHAM, Primary Examiner

C. E. HALL, Assistant Examiner

U.S. Cl. X.R.

29—205 D, 434; 308—163; 310—42, 89, 90